(No Model.) 2 Sheets—Sheet 2.
N. R. FLINT.
LATHE FOR WOODEN HANDLES.
No. 384,355. Patented June 12, 1888.
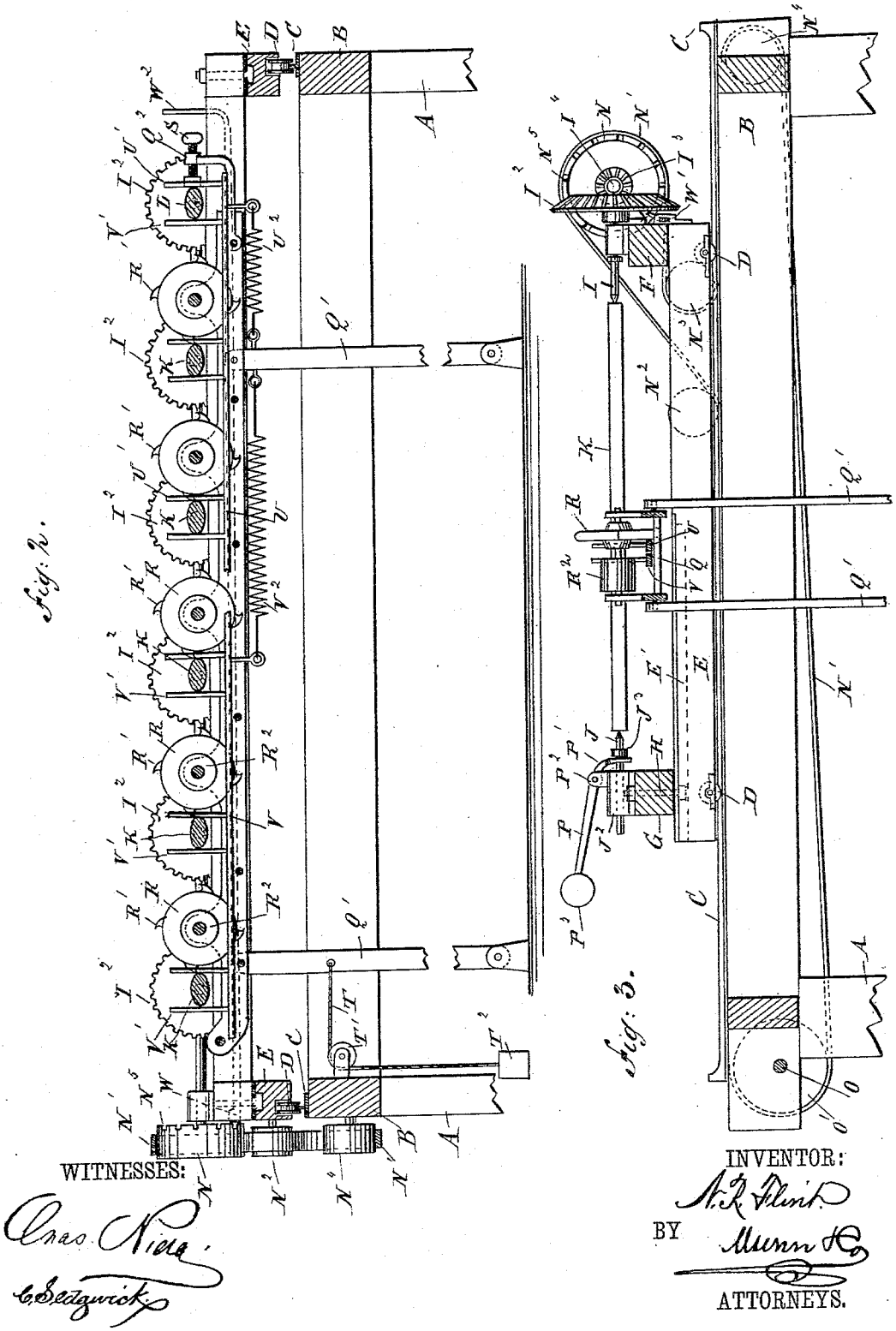
WITNESSES:
Chas Niere
C. Sedgwick
INVENTOR:
N. R. Flint
BY Munn & Co
ATTORNEYS.

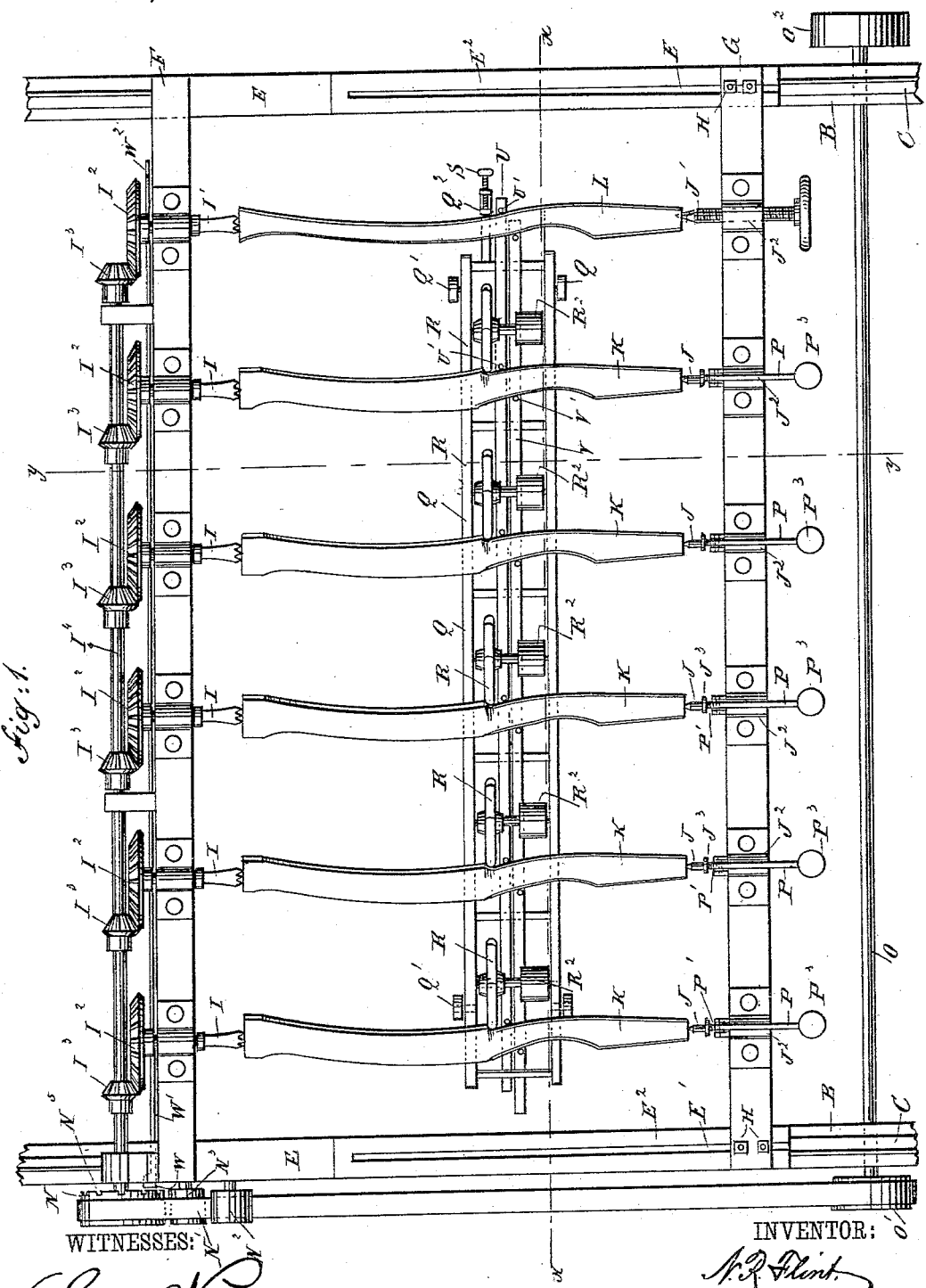

UNITED STATES PATENT OFFICE.

NATHAN RIPLEY FLINT, OF EAST HIRAM, MAINE.

LATHE FOR WOODEN HANDLES.

SPECIFICATION forming part of Letters Patent No. 384,355, dated June 12, 1888.

Application filed November 28, 1887. Serial No. 256,320. (No model.)

*To all whom it may concern:*

Be it known that I, NATHAN RIPLEY FLINT, of East Hiram, in the county of Oxford and State of Maine, have invented a new and Improved Lathe for Turning Wooden Handles, of which the following is a full, clear, and exact description.

The object of my invention is to provide a new and improved lathe specially adapted for turning a number of wooden handles at a time to the shape of a former.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of my improvement. Fig. 2 is a longitudinal sectional elevation of the same on the line $x\,x$ of Fig. 1, and Fig. 3 is a vertical cross-section of the same on the line $y\,y$ of Fig. 1.

A suitably-constructed frame, A, is provided with the two side beams B B, each carrying a rail, C, on which are held to travel the flanged rollers D, mounted in the under side of the side bars E, united at their rear ends by a longitudinal beam, F, rigidly secured to the said side beams E. The front ends of the side beams E E are connected with each other by a beam, G, held to slide on the said side beams E by bolts H passing through slots E' in plates $E^2$ on the beams E and through the longitudinal beams G, with their heads beneath the plates $E^2$ in grooves formed on the tops of the side beams E. Thus it will be seen that the side beams E, the rigid longitudinal beam F, and the adjustable beam G constitute a sliding frame which travels, by means of the flanged rollers D, on the rails C, held on the main frame A.

The longitudinal beam G is always held parallel with the rigid beam F, and is adjustable so as to leave any desired distance between the two beams, after which the said beam G is secured in place by adjusting the nuts on the upper ends of bolts H, whereby the said longitudinal beam G is firmly clamped on the side beams E.

On the rigid longitudinal beam F are mounted to rotate, a number of dogs, I, and directly opposite the said dogs are mounted to slide the arbors J on the adjustable longitudinal beam G. Between the dogs I and the arbors J are held the wooden blocks K to be turned into handles. A dog I', similar to the dogs I, is also mounted to rotate on the rigid longitudinal beam F, and a screw-arbor, J', is held opposite the said dog I' in the longitudinal adjustable beam G. Between the dog I' and the screw-arbor J' is held a former, L, of the shape to which the wooden blocks K are to be turned. Each of the dogs I and I' is provided with a bevel gear-wheel, $I^2$, into which meshes a bevel-pinion, $I^3$, secured to the longitudinal shaft $I^4$, mounted to rotate in suitable bearings secured to the rear of the rigid beam F.

On one outer end of the shaft $I^4$ is secured a pulley, N, over which passes an endless belt, N', which also passes under an idler, $N^2$, mounted to rotate on a stud secured to one side beam E. The endless belt N' also passes over another idler, $N^3$, mounted to rotate on the same beam E, and from the said idler $I^3$ the belt N' passes over an idler, $N^4$, mounted to rotate on one of the side beams B of the frame A, near its rear end. On the front ends of the side beams B is held to rotate the main driving-shaft O, provided with a pulley, O', over which said belt N' passes, and said main shaft O is provided with a driving-pulley, $O^2$, connected in any suitable manner with machinery for imparting a rotary motion to said main driving-shaft O. The rotary motion of the main driving shaft O is transmitted by the pulley O' and the belt N' to the pulley N, secured to the shaft $I^4$, so that the latter is rotated and imparts in turn simultaneously a rotary motion to all the dogs I and I' by means of the bevel-pinions $I^3$ and the bevel gear-wheels $I^2$. A forward and backward movement of the lathe-frame above described does not prevent the shaft O from imparting a rotary motion to the shaft $I^4$, as the said endless belt N', which transmits the motion from the pulley O' to the pulley N, passes over the idlers $N^2$, $N^3$, and $N^4$, connected, respectively, with the sliding frame and the beam B.

The arbors J are held to slide transversely in the bearings $J^2$, secured to the adjustable longitudinal beam G, and each arbor J is provided with a collar, J³, against which operates an eye or fork, P', of a lever, P, pivoted on a lug, P², secured to the bearing J², and the outer end of each lever P is provided with a weighted ball, P³, which has the tendency to hold the arbor J with its point against one end of the respective wooden block K.

Between the side beams B and E and the longitudinal beams F and G is held the cutter-frame Q, pivotally mounted on the upright arms Q', pivoted at their lower ends in any suitable manner to the main frame A or to the floor on which the latter stands. The arms Q' thus permit an endwise rocking motion of the cutter-frame Q. On the latter are mounted to rotate a number of cutter-wheels, R, each provided in its rim with a series of cutting-knives, R', adapted to shape the wooden blocks K to the form of the former L. The number of cutter-wheels R corresponds with the number of wooden blocks K to be turned simultaneously on the machine. The shaft of each cutter-wheel R is provided with a pulley, R², connected in any suitable manner with means for imparting a rotary motion to the cutter-wheels R.

On one end of the rocking frame Q is formed an upwardly-extending arm, Q², in which screws a set-screw, S, abutting at its inner end against the former L. The set-screw S is held in continuous contact with the former L by means of a rope, T, secured to one of the arms Q', and passing over a pulley, T', mounted on one of the side beams D. The rope T then extends downward and carries on its lower end a weight, T², which exerts a constant pull against the arm Q', so that the set-screw S is held in yielding contact with the former L. Directly alongside the cutter-wheels R a bar, U, is held to slide longitudinally on the rocking frame Q, and said bar U is provided with upwardly-extending pins U', engaging one side of the former L and the turned part of the wooden blocks K. A spring, U², secured by one end to the said bar U, is connected by its other end to one of the arms Q', and thus exerts a constant pull on the said bar U, so as to hold the pins U' in contact with the former L and the turned part of the wooden blocks K. A similar yielding bar, V, is mounted on the rocking frame Q, and is also provided with the upwardly-extending pins V', engaging the other side of the former L and the turned parts of the wooden blocks K. A spring, V², is connected with the said bar V and one of the arms Q' in a similar manner to the above-described spring Q², so that the pins V' are held in yielding contact with one side of the former L and the turned parts of the wooden blocks K. It will be seen that the pins U' engage the former L and the cutter side of the wooden blocks K, whereby the wooden blocks are prevented from trembling and the cutters R' are prevented from gouging the wooden blocks K. The pins V' engage the other side of the former L and the blocks K, preventing the latter from swinging away from the cutters, so as to insure a uniform cutting of the knives R'.

The rotary motion imparted to the shaft I⁴ from the main shaft O can be interrupted at any time by a block, W, adapted to engage the notches N⁵, formed in the rim of the pulley N. The block W is secured to a rod, W', held to slide in suitable bearings on the fixed longitudinal beam F, and is provided at its extreme outer end with a handle, W², operating the said rod W'—that is, for throwing the block W in or out of contact with one of the notches N⁵ in the wheel N. When the block W engages one of the notches N⁵, the pulley N is prevented from turning and the driving-belt N' slips over said pulley N. This is necessary in order to stop simultaneously the handles of the former in any desired position for taking out the handles and former and replacing them.

The operation is as follows: The former L is placed on the dog I' and the arbor J' in the usual manner, so that when said dog I' is rotated said former L is turned. The distance between the longitudinal beams depends on the length of the former, and in order to accommodate formers L of various lengths I adjust the longitudinal beam G by the bolts H, as above described. The wooden blocks K to be turned into handles of the same shape as the former L are of the same length as the latter and are held between the opposite dogs I and arbors J. In order to fasten the wooden blocks on the dogs I and arbors J, I first throw the respective lever P upward, so that the arbor J slides outward, giving ample room for fastening one end of the wooden block K on the dog I, as shown in Fig. 1. The lever P is then thrown downward, so that the arbor J is moved inward, whereby its pointed end engages, in the usual manner, the other end of the block K. The weight P, by pressing against the collar J³, holds the said arbor in contact with the wooden block K, but permits a rotary motion of the latter. The sliding frame is now moved rearwardly until the cutters R' of the cutting-wheels R engage the front ends of the wooden blocks K. The inner end of the set-screw S now rests against the front end of the former L, and the pins U' and V' engage the respective sides of the former L and the wooden blocks K. A rotary motion is imparted to the former L and the wooden blocks K, as above described, and the operator now pulls on the beam G of the sliding frame, so that the cutters R' of the cutter-wheels R come in contact with the wooden blocks K and remove sufficient material to form the said wooden blocks into handles of the same shape as the former L.

It will be seen that by the outward sliding motion of the frame carrying the wooden blocks K and the former L the set-screw is always held in contact with the former L and follows the respective shape of the said former on account of the frame Q being mounted to rock. The weight T² always holds the set-screw S in contact with the former L, so that the frame Q, carrying the cutter-wheels R, must necessarily follow the shape of the former L, whereby the cutters R trim the wooden blocks K according to the shape of the former L. Thus it will be seen that any desired number of handles can be turned simultaneously to the shape of one former. By adjusting the set-screw S the cutter-wheels will be moved toward or from the blocks of wood, thereby permitting larger or smaller handles than the pattern or former to be made.

Having thus described my invention, what I claim as new, and desire to secure by Letters Patent, is—

1. In a wood-turning lathe, the combination, with a cutter-frame and standards pivoted to said frame and to a suitable support, of bar sliding in said frame and provided with pins projecting on opposite sides of the work to be turned, and the former and springs secured to the opposite sides of the said standards and to the bars, substantially as herein shown and described.

2. In a wood-turning lathe, the combination, with a sliding frame carrying a simultaneously-rotating former and the blocks to be turned, of a pivoted frame adapted to rock according to the shape of the said former, cutter-wheels mounted to rotate on the said rocking frame, yielding bars adapted to slide on the said frame, and pins projecting from said bars and engaging both sides of the said former and the said blocks, substantially as shown and described.

3. In a wood-turning lathe, the combination, with the main frame and driving-shaft O, provided with a pulley at one end, of a sliding frame, rotary dogs carried by said sliding frame, the shaft I⁴, for operating said dogs, provided with a pulley at one end, idler-pulleys N² N³ on the sliding frame, idler-pulleys N⁴ on the main frame, and a belt passing around the pulleys on the ends of the shafts O I⁴ and idlers, substantially as and for the purpose set forth.

4. In a wood-turning lathe, the combination, with a main frame carrying the main driving-shaft, of a frame held to slide in the said main frame and carrying the former and the wooden blocks to be turned, dogs held on the said sliding frame and rigidly connected with one end of the said former and the blocks to be turned, said dogs being rotated from the said main driving-shaft, a rocking frame held within said sliding frame, cutter-wheels mounted to rotate on the said sliding frame and adapted to cut said wooden blocks, a set-screw held on the said rocking frame and engaging one side of the said former, and a weight for holding said set-screw in contact with the said former, substantially as shown and described.

5. In a wood-turning lathe, the combination, with a main frame carrying the main driving-shaft, of a frame held to slide in said main frame and carrying the former and the wooden blocks to be turned, dogs held on the said sliding frame and rigidly connected with one end of the said former and the blocks to be turned, said dogs being rotated upon the said main driving-shaft, a rocking frame held within said sliding frame, cutter-wheels mounted to rotate on the said sliding frame and adapted to cut said wooden blocks, a set-screw held on the said rocking frame and engaging one side of the said former, a weight for holding said set-screw in contact with the said former, and yielding bars provided with pins engaging both sides of the said former and the said wooden blocks, said bars being mounted on said rocking frame, substantially as shown and described.

NATHAN RIPLEY FLINT.

Witnesses:
LEMUEL COTTON,
DENNIS MORRILL.